US012804334B2

(12) United States Patent
Bucher et al.

(10) Patent No.: US 12,804,334 B2
(45) Date of Patent: Nov. 17, 2026

(54) PROCESSING CHIP FOR PROCESSING AUDIO SIGNALS USING AT LEAST ONE DEEP NEURAL NETWORK IN A HEARING DEVICE

(71) Applicant: SONOVA AG, Staefa (CH)

(72) Inventors: Samuel Bucher, Rapperswil (CH); Hans-Ueli Roeck, Hombrechtikon (CH); Fethi Cherigui, Adliswil (CH)

(73) Assignee: Sonova AG, Staefa (CH)

(*) Notice: Subject to any disclaimer, the term of this patent is extended or adjusted under 35 U.S.C. 154(b) by 224 days.

(21) Appl. No.: 18/890,546

(22) Filed: Sep. 19, 2024

(65) Prior Publication Data

US 2025/0016510 A1 Jan. 9, 2025

Related U.S. Application Data

(63) Continuation of application No. 18/614,362, filed on Mar. 22, 2024, now Pat. No. 12,108,219.

(30) Foreign Application Priority Data

Mar. 24, 2023 (EP) .................................... 23163893

(51) Int. Cl.
*H04R 25/00* (2006.01)

(52) U.S. Cl.
CPC .................................. *H04R 25/507* (2013.01)

(58) Field of Classification Search
CPC ......................... H04R 25/507; H04R 2225/43; H04R 25/453; H04R 1/1083; H04R 2225/55;

(Continued)

(56) References Cited

U.S. PATENT DOCUMENTS

| | | | |
|---|---|---|---|
| 2019/0236437 A1 | 8/2019 | Shin et al. | |
| 2022/0159403 A1 | 5/2022 | Sporer et al. | |

(Continued)

FOREIGN PATENT DOCUMENTS

| | | | | |
|---|---|---|---|---|
| CN | 110019931 A | 7/2019 | | |
| WO | WO-2020190797 A1 * | 9/2020 | ......... | G06F 12/0888 |
| WO | 2022022585 A1 | 2/2022 | | |

OTHER PUBLICATIONS

European Search Report and Written Opinion mailed Sep. 25, 2023 in European Application No. EP23163893.3.

*Primary Examiner* — Ryan Robinson

(74) *Attorney, Agent, or Firm* — ALG Intellectual Property, LLC

(57) ABSTRACT

A processing chip for processing audio signals using at least one deep neural network in a hearing device includes a first compute unit having a hardware architecture adapted for processing one or more convolutional neural network layers of the at least one deep neural network, a second compute unit having a hardware architecture adapted for processing one or more recurrent neural network layers of the at least one deep neural network, a shared memory unit for storing data to be processed in respective layers of the at least one deep neural network, the shared memory unit comprising a memory controller configured for running on a memory controller clock frequency that is higher than a compute unit clock frequency of both the first compute unit and the second compute unit, and a data bus system for providing access to the shared memory unit.

16 Claims, 7 Drawing Sheets

(58) Field of Classification Search
CPC .............. H04R 2225/41; H04R 25/552; H04R 2460/01; H04R 3/005; H04R 25/43; H04R 25/50; G10L 25/30; G06F 9/5044; G06F 9/46; G06F 9/50; G06F 12/0802; G06F 13/28; G06F 9/5027
See application file for complete search history.

(56) References Cited

U.S. PATENT DOCUMENTS

| | | | |
|---|---|---|---|
| 2022/0329953 | A1 | 10/2022 | Chen et al. |
| 2023/0074002 | A1 | 3/2023 | Zhang et al. |
| 2023/0292074 | A1 | 9/2023 | Marquardt et al. |

* cited by examiner

PROCESSING CHIP FOR PROCESSING AUDIO SIGNALS USING AT LEAST ONE DEEP NEURAL NETWORK IN A HEARING DEVICE

RELATED APPLICATIONS

The present application is a continuation of U.S. patent application Ser. No. 18/614,362, filed March 22,2024, which claims priority to EP patent application Ser. No. 23/163, 893.3, filed Mar. 24, 2023, each of which is hereby incorporated by reference in its entirety.

BACKGROUND INFORMATION

Machine learning techniques, in particular neural networks, have proven to produce good results in audio signal processing. Complex neural networks, which comprise at least one hidden layer, are particularly suitable for complex processing tasks. Such networks are referred to as deep neural network (DNN).

DNN computation is by many orders of magnitude more compute and data intensive than classical audio signal processing. This restricts the usability of DNN processing on hearing devices, which due to size constraints have restricted computational power and battery capacity. As such, complex DNN processing on a hearing device is severely limited.

Particular suitable DNN structures for audio signal processing combine layers of different types of neural networks, namely convolutional neural networks (CNN) and recurrent neural networks (RNN). These different types of neural network architectures have different demands on computing and data throughputs. As such, known hardware structures for accelerating neural network processing do not suffice to efficiently compute all different layers of a complex DNN. A known workaround is to run processing units for neural networks at very high clock rates to compensate for their less efficient hardware structure. This is however no option for hearing devices which do not bring sufficient computational power and battery capacity for consistently running processing units at high clock rates.

BRIEF DESCRIPTION OF THE DRAWINGS

Further details, features and advantages of the inventive technology are obtained from the description of exemplary embodiments with reference to the figures, in which.

DETAILED DESCRIPTION

Figure 1:
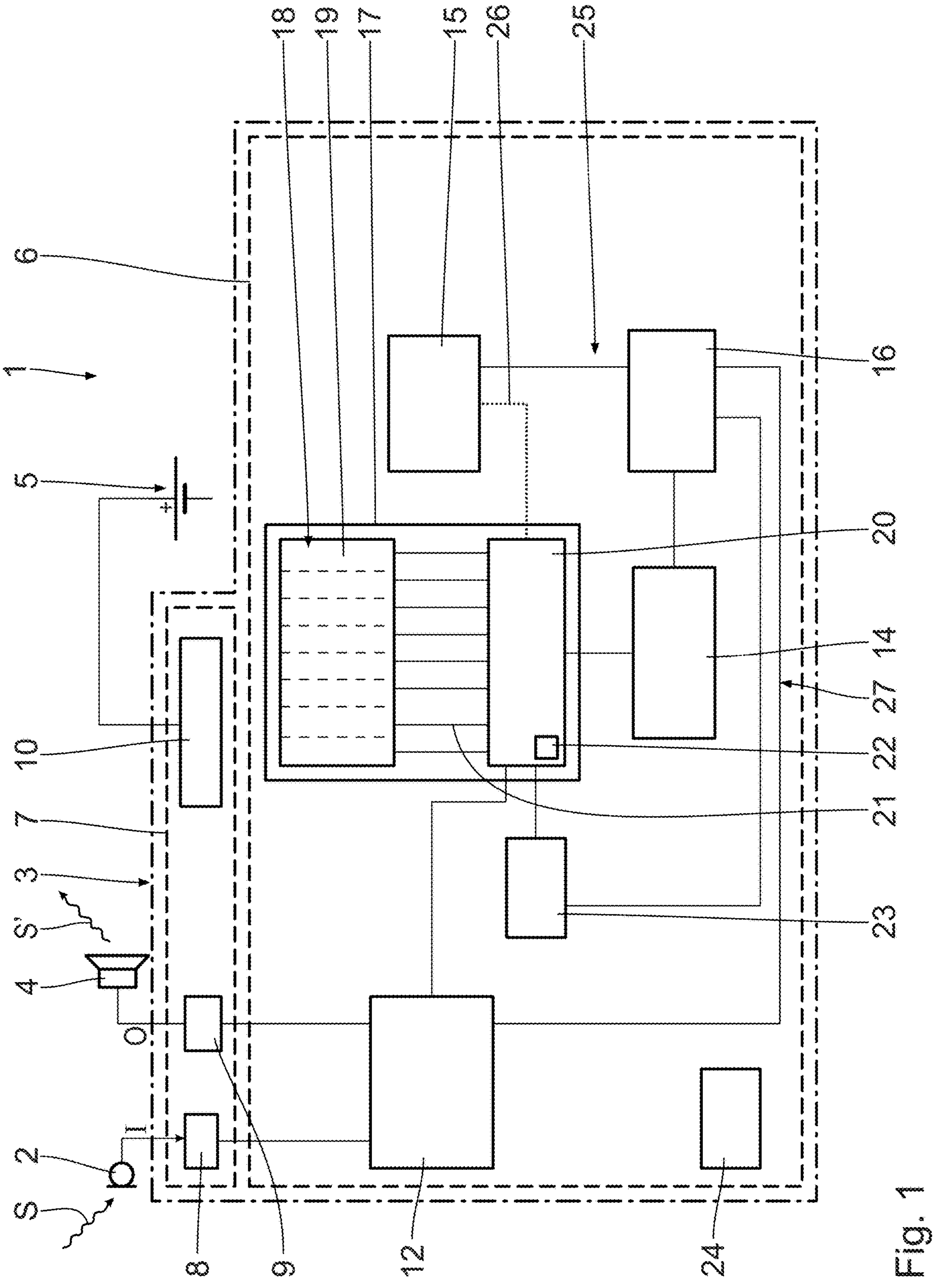
FIG. 1 shows a schematic depiction of a hearing device comprising a processing chip for processing audio signals using at least one deep neural network.

The technology disclosed herein concerns a processing chip for processing audio signals using at least one deep neural network in a hearing device. The present inventive technology further concerns a hearing device with such a processing chip.

It is feature described herein to improve a processing chip for audio signal processing using at least one deep neural network on a hearing device, in particular, to provide a processing chip for a hearing device, which allows for efficient processing of DNNs comprising RNN layers as well as CNN layers.

This feature is achieved by the processing chip for processing audio signals using at least one deep neural network in a hearing device as described herein. The processing chip comprises a first compute unit having a hardware architecture adapted for processing one or more convolutional neural network layers of the at least one DNN, a second compute unit having a hardware architecture adapted for processing one or more recurrent neural network layers of the at least one DNN, a control unit for directing the first compute unit and the second compute unit when to compute a respective layer of the at least one DNN, a shared memory unit for storing data to be processed in respective layers of the at least one DNN, and a data bus system for providing access to the shared memory unit for each of the first compute unit and the second compute unit. The data bus system comprises a narrow bus network to the shared memory unit for the first compute unite, and a wide bus to the same shared memory unit for the second compute unit.

Advantageously, the processing chip combines specific hardware for processing different architectures of neural networks, namely CNN and RNN. As such, respective layers of at least one DNN can be efficiently computed on the processing chip, improving possible use cases of complex DNN processing on hearing devices. Particularly advantageous, the shared memory unit stores data to be processed by the respective layers directly on the chip. As such, the compute units can access respective data directly on the chip, in particular exchange data via the shared memory unit. Exchanging data via or loading input data from off-chip memory and respective delays are avoided. The data bus system allows for an efficient and fast data exchange between the compute units and the shared memory unit.

A processing chip in the sense of the present inventive technology is a monolithic hardware component. The processing chip is integrated on a single substrate, in particular a single silicon wafer. The compute units, the control unit, the data bus system and the shared memory unit as well as possible further components of the processing chip are integrated thereon. This allows for a particularly efficient data exchange between different compute and/or memory units. Further, the processing chip has a compact design, utilizing in particular at most 15 $mm^2$, e.g., less than 10 $mm^2$, or e.g., less than 5 $mm^2$ in order to reside together with other electronic components within, at or around an ear canal.

In some examples, the processing chip may not only be capable of executing at least one deep neural network, but may be configured for providing further processing functionalities for audio signal processing, which are not implemented by the at least one deep neural network. In particular, the chip may provide hardware for pre-processing, post-processing and/or other audio processing routines not implemented by the at least one deep neural network.

A hearing device in the sense of the present inventive technology is any device system or service to compensate for hearing loss, to reduce hearing effort, to improve speech intelligibility, to mitigate the risk of hearing loss or to generally process audio signals, including but not limited to implantable or non-implantable medical hearing devices, hearing aids, over-the-counter (OTC) hearing aids, hearing protection devices, hearing implants such as, for example, cochlear implants, wireless communication systems, headsets, intercom devices, wireless microphones, media streamers and other hearing accessories, ear buds, ear phones, headphones, hearables, personal sound amplifiers, ear pieces, earmolds, otoplastics and/or any other professional and/or consumer (i.e. non-medical) audio devices, and/or any type of ear level devices provided at, in or around the ear.

In the present context, an audio signal may be any electrical signal, which carries acoustic information. In particular, an audio signal may comprise unprocessed or raw audio data, for example raw audio recordings or raw audio wave forms, and/or processed audio data, for example audio features, compressed audio data, a spectrum, in particular a frequency spectrum, a cepstrum and/or cepstral coefficients and/or otherwise modified audio data. The audio signal can particularly be a signal representative of a sound detected locally at the user's position, e.g. generated by one or more electroacoustic transducers of the hearing device. An audio signal may be in the form of an audio stream, in particular a continuous audio stream, e.g. received by a radio transmitter of the hearing device. Audio signals mentioned in the present context can also have different characteristics, format and purposes. In particular, different kinds of audio signals, e.g. an input audio signal and/or an output audio signal, may differ in characteristics and/or metric and/or format.

The processing chip serves for processing audio signals on a hearing device. The processing chip may perform all audio signal processing on the hearing device and/or parts thereof. In particular, the processing chip may contribute to the audio signal processing on the hearing device, e.g. taking over specific tasks or steps of the audio signal processing, while other parts of the audio signal processing are performed on other processing components of the hearing device, which are not part of the processing chip. Processing components, which are not part of the processing chip, are also referred to as off-chip logic.

Audio signal processing as used in the present context may refer to any processing of audio signals on the hearing device, including but not limited to: beamforming, classification, in particular classification of an auditory acoustic scene, feedback cancelling, noise cancelling, speaker separation, amplification, in particular amplification to at least partly compensate for perceived hearing difficulty, improvement of speech understanding, and/or source separation. The at least one DNN at least contributes to one or more audio processing tasks to be performed on the hearing device. The at least one DNN may in particular be used for classification tasks, in particular classification of an acoustic auditory scene, noise cancellation, speech command analysis, audio signal and/or audio source separation, output audio generation, speaker separation, own voice detection, and/or third-party voice detection. In some examples, the processing chip is adapted for performing audio signal processing using a plurality of DNN, wherein each DNN may perform one or more of the above tasks.

The first compute unit has a hardware architecture adapted for processing one or more CNN layers of the at least one DNN. This is in particular to be understood in that the hardware architecture of the first compute unit is specifically adapted for efficiently processing at least one CNN layer. In particular, the hardware architecture of the first compute unit is structured such that many simple arithmetic operations can be computed in many parallel processing elements arranged in a one or two dimensional grid, where each processing element may include local means to store input, intermediate and/or output data and/or transmitting such data to an adjacent or nearby processing element for usage in a subsequent operation. Here and in the following, the first compute unit is also referred to as CNN compute unit.

The second compute unit has a hardware architecture adapted for processing one or more RNN layers of the at least one DNN. This is in particular to be understood in that the hardware architecture of the second compute unit is particularly adapted for efficient processing of at least one RNN layer. In particular, the hardware architecture of the second compute unit is structured such that not only input data but also at least most weight parameters can get loaded from on-chip memory, in particular the shared memory unit, with every compute step. Here and in the following, the second compute unit is also referred to as RNN compute unit.

The CNN compute unit and the RNN compute unit have different hardware architectures to accommodate for the processing requirements of the respective layers to be processed thereby. This allows for an efficient processing of the CNN and RNN layers of the at least one deep neural network. High clock frequencies of the compute unit, which would be necessary if the processing chip was not adapted to both of the neural network architectures, are avoided. This reduces the energy consumption in DNN processing, allowing for the computation of complex DNN structures despite limited processing and battery capacities on hearing devices.

For example, a compute unit clock frequencies of the first and second compute unit might lie in the range of 10 MHz to 100 MHz. This is significantly lower than clock frequencies normally required for executing DNN layers. For example, the clock frequency in GPUs (graphic processing units), which are customarily used to process DNNs, are usually in the range of 1 GHz or more, drawing unsustainable amounts of power for the battery capacity available in a hearing device The shared memory unit serves for storing data to be processed by the respective layers of the at least one DNN. Data to be processed by the respective layers is the data inputted to the layers for being processed thereby. As CNN and RNN layers are interspersed in relevant DNN structures, in particular in a sequential arrangement, output data of one of the layers is used as input data for another, in particular the next layer of the at least one DNN. Data to be processed by the respective layers and to be stored on the shared memory unit, in particular, comprises input data to be inputted to the respective layers as well as output data outputted by the respective layers. As such, the shared memory unit and the data bus system ensure that input data and output data of the respective layers can get reused without moving data from one memory location to another one. The input data and output data is accessible in a flexible fashion.

Input data to be processed by one of the layers, in particular by the first layer of the at least one DNN, may be an audio signal and/or features derived therefrom. For example, audio signals to be processed, in particular input audio signals obtained by the hearing device, may be pre-processed by a pre-processing unit to obtain features and/or an audio signal format adapted for being inputted to the DNN.

Output data of the respective network layers, in particular output data of the at least one DNN, may comprise an audio signal and/or other kinds of data for usage in the audio signal processing. For example, the at least one DNN may output an audio signal which can be directly used for being outputted to the user, e.g. by an output unit of the hearing device. For example, the outputted audio signal may be a target signal obtained by cancelling noise from the input signal and/or speech of one or more speakers. Additionally or alternatively, the output data of the at least one DNN may comprise a classification result, e.g. resembling an acoustic auditory scene. Further, the output data may comprise filtering data and/or gain data, in particular filtering masks, for being applied to an audio signal, e.g. for feedback cancellation and/or noise cancellation.

In some examples, also network data can be stored on the shared memory unit. In the present context, the term network data indicates data which defines the respective layers of the at least one DNN, in particular weights, biases and activation functions. Storing at least parts of the network data on the processing chip, in particular on the shared memory unit, has the advantage that the network data does not have to be loaded from off-chip memory during audio signal processing. After booting the hearing device, the respective network data, e.g., all network data, is stored on the processing chip, avoiding reloading of network data during usage.

The shared memory unit may comprise a shared memory and a memory controller for accessing the shared memory. The data bus system in particular connects the compute units to the memory controller. The memory controller can then connect to the shared memory.

In some examples, the shared memory may comprise a plurality of segments, which may be individually and independently accessed via the memory controller. This allows for a particularly efficient and flexible data handling, in particular when large amounts of data need to be loaded for processing a layer, in particular a RNN layer.

The data bus system comprises two or more data buses for connecting the compute units to the shared memory unit, in particular the memory controller thereof. Each compute unit is connected by individual data buses to the shared memory. Depending on the memory access needs of the respective compute units, different data buses may be used for the different compute units. In particular, a data bus for connecting the RNN compute unit to the shared memory unit may have a wider bandwidth than a data bus for connecting the CNN compute unit to the shared memory unit, reflecting the higher data transfer needs for computing an RNN layer.

The data bus system may further connect other components of the processing chip to the first compute unit, the second compute unit and/or the shared memory unit. For example, the control unit may be connected to the first compute unit, the second compute unit and/or the shared memory unit via the data bus system.

The processing chip may comprise further components, including but not limited to a direct memory access unit, a pre-and/or post-processing unit and/or an analog functions unit. An analog functions unit may be configured for applying adaptive body biasing, clock frequency adaption and/or supply voltage adaption to at least parts of the processing chip to further reduce the power consumption of the processing chip. One or more of the additional components may be connected to the compute units, the control unit and/or the shared memory unit via the data bus system.

The control unit directs the CNN compute unit and the RNN compute unit when to compute a respective layer of the at least one DNN. In particular, the control unit configures the first and second compute units on the structure of the at least one DNN by providing information about at least the input vector width, the particular type of computation, base addresses and offsets for input data, weight data, bias and/or activation functions. The particular type of computation contains by example information about the RNN type, e.g. GRU or LSTM, or about the particular CNN operation, e.g. matrix multiplication or max pooling. For example, the control unit may also provide control inputs to the CNN compute unit and/or the RNN compute unit, to adapt the processing on the respective compute units to the specific requirements of the layer to be executed, e.g. by choosing respective activation functions or the like. For example, a compiler used for compiling the at least one DNN provides data on the sequence and configuration of layers of the at least one DNN to the control unit. The control unit then uses this data to configure the compute units and triggers the execution of the respective layers in the sequence in which the layers are contained in the at least one DNN. When the processing of a layer is finished by the respective compute unit, the compute unit may inform the control unit about finishing its current processing task. The control unit may then initiate the processing of the subsequent layer of the at least one DNN. For that purpose, the respective compute unit can access the shared memory unit to receive output data from the previous layers for using it as input data. In some cases, it may be advantageous to first reorganize the output data on the shared memory unit, in particular on the shared memory, to allow for an efficient access of the data needed by the compute unit used for executing the subsequent layer. Such reorganization may be performed by a direct memory access (DMA) unit, which may also be configured and triggered by the controller.

In some examples, the narrow bus network may connect also other components of the chip to the shared memory unit or to each other. The RNN compute unit and further components of the processing chip, in particular the CNN compute unit, can independently of each other access the shared memory unit. The narrow data bus network can for example comprise a single narrow data bus for connecting further components of the processing chip to the shared memory unit, in particular the first compute unit and the control unit.

It is also possible, that the narrow bus network comprises several narrow data buses, in particular data buses for connecting individual components, e.g. the CNN compute unit and/or the control unit, to the shared memory unit.

The terms "wide" and "narrow" are to be understood in that the bandwidth of the wide bus is larger than the bandwidth of the one or more narrow data buses of the narrow bus network. While the wide bus may, for example, have at least 1024 bits, an exemplary narrow data bus may have 128 bits.

According to an illustrative aspect of the inventive technology, the wide bus has a bandwidth of at least 1024 bits for providing access to the shared memory only for the second compute unit. Providing a wide bus, which exclusively connects the RNN compute unit to the shared memory unit, has the advantage of particularly fast data access for the RNN compute unit. This ensures high data transfer rates for processing large amounts of data as required in RNN layers within one clock cycle and thus not stalling the compute unit to wait until a full vector is loaded from memory. Particularly advantageous, the wide bus ensures that large data traffic between the shared memory unit and the RNN compute unit does not impede data traffic between the shared memory unit and further components of the processing chip, in particular the CNN compute unit.

Additionally to the wide bus, the data bus system may comprise the aforementioned narrow bus network having one or more narrow data buses for connecting the remaining components of the processing chip, in particular the CNN compute unit, to the shared memory unit.

According to an illustrative aspect of the inventive technology, the second compute unit comprises several slices and the wide bus comprises sub-buses for providing concurrent data access to the shared memory unit for each slice. The individual slices can independently of each other access the shared memory unit. In some examples, the individual slices can be executed by the second compute unit independently from each other. This increases the flexibility of processing one or more RNN layers of one or more DNNs in parallel. Each sub-bus may, for example, have a bandwidth of at least 128 bits.

According to an illustrative aspect of the inventive technology, each slice may access a respective segment of the shared memory via the respective sub-bus.

According to an illustrative aspect of the inventive technology, the first compute unit comprises a two-dimensional architecture of processing elements, in particular a systolic array. Such hardware architectures have proven to be particularly suitable for efficiently processing a CNN layer of a DNN.

According to an illustrative aspect of the inventive technology, the first compute unit is configured for dividing the two-dimensional array of processing elements into two-dimensional sub-arrays, which can be executed independently of each other. This is particularly useful for parallelizing different operations of CNN layers. In particular, different sub-arrays may be used to calculate different CNN layers of one or different DNNs. Further, for CNN layers of less than the maximum width supported by the dimensions of the two-dimensional array, not needed sub-arrays can get disabled such that they do not consume active power.

According to an illustrative aspect of the inventive technology, the second compute unit comprises at least one slice, each slice being configured to compute, in particular sustainably compute, a scalar product of two vectors in at most three clock cycles, e.g., in at most two clock cycles. A correspondingly configured compute unit allows for a particularly efficient processing of an RNN layer, in particular comprising a gated recurrent unit (GRU) and/or a long short-term memory (LSTM). Executing such RNN layers comprises calculating scalar products of large data vectors with weight matrices. The RNN compute unit is particularly suited for such operations.

In some examples, the RNN compute unit may comprise off-slice logic, e.g. arithmetic elements and/or registers for further processing a slice output of the at least one slice.

For example, each slice of the RNN compute unit may comprise a plurality of parallel processing elements configured for multiply and/or multiply add operations followed by a summation component for summing up the outputs of the plurality of processing elements. In particular, an output of each processing element may be written to a downstream intermediate register which is accessed by the summation component. Additionally or alternatively, the output of the processing elements may be transferred to an upstream data register and/or weight register. In particular the latter can be used for executing multiply add operations.

According to an illustrative aspect of the inventive technology, the second compute unit comprises several slices being configured to be executed independently of each other. As such, the RNN compute unit can be used to calculate several scalar products independently of each other. This is particularly useful for parallelizing different operations of RNN layers, e.g. multiplying weight matrices with input data and parallelly with output data of the last time increment. Further, different slices may be used to calculate scalar products of different RNN layers of one or different DNNs. For example, the RNN compute unit may comprise 8, 16 or 20 slices. Further, for RNN layers of less than the maximum width supported by the hardware, the remaining slices can get disabled such that they do not consume active power.

According to an illustrative aspect of the inventive technology, the second compute unit is configured to sum up a slice output of a selectable set of slices, in particular without requiring an additional clock cycle. For example, the RNN compute unit may comprise off-slice logic having a summation component for selectively summing up the slice outputs of a selectable set of slices. Selectively summing up slice outputs has the advantage, that several slices can be combined for calculating a scalar product. Different slices may be combined to different sets for parallelly calculating scalar products, each including several slices. In some examples, the summation of the slice outputs does not require an additional clock cycle, for example by combining the summation components of the slices contained in the set so that the outputs of the respective processing units are all summed up.

Summing up a selectable set of slices, in particular several selectable sets of slices, may result in different summation outputs. In some examples, the RNN compute unit, in particular off-slice logic of the RNN compute unit, comprises an output register dimensioned to hold summation results of several sets of slices. For example, contents of the output register can be fed back to the summation component to be added to in subsequent summation operations.

According to an illustrative aspect of the inventive technology, the second compute unit comprises hardware acceleration adapted for applying one or more activation functions to an intermediate output of the second compute unit. In some examples, the hardware acceleration is adapted for selectively applying one of several activation functions, e.g. a sigmoid function and/or a hyperbolic tangent function, and/or for applying operators like SoftMax, element-wise masking, MatMul and/or other matrix multiplications to efficiently calculate self-attention layers. The hardware acceleration may be part of an off-slice logic of the RNN compute unit.

An intermediate output of the second compute unit may be a slice output of at least one slice, a summation result of summing up at least one set of slices and/or with an additional bias.

According to an illustrative aspect of the inventive technology, the memory controller of the shared memory unit is configured for running on a memory controller clock frequency, which is higher than a compute unit clock frequency of the first compute unit and the second compute unit. Since the first and second compute units are able to run the processing of the layers of the at least one DNN at low clock frequency, the flexibility of choosing the memory controller clock frequency is increased. Having a higher memory controller clock frequency ensures that data access by the RNN compute unit and the CNN compute unit is not a bottleneck for processing the respective layers of the at least one DNN. In particular, the respective compute units do not have to be stalled due to backlog in the memory access.

In some examples, the memory controller clock frequency is chosen for ensuring concurrent access to the shared memory by at least the first compute unit and the second compute unit within the same compute unit clock cycle. For example, the memory control clock frequency can be chosen as f=K·F, wherein F is the compute unit clock frequency and K is a factor of at least 2. K can for example be chosen between 2 and N, wherein N is the number of components which require concurrent access to the shared memory via the memory controller of the shared memory unit. For example, concurrent access may be required by at least two of the following components: a pre-/post-processing unit, a direct memory access unit, the control unit, the CNN compute unit and/or the RNN compute unit. If all of the before mentioned components require concurrent memory access, K may be 5. In some examples, the memory controller clock frequency, in particular the factor K, can be varied dynamically based on the present memory access needs.

In some examples, the shared memory is configured for being accessed in a staggered manner. For example, the shared memory can be accessed by the memory controller in a staggered manner, in particular by accessing only every second, fourth, eighth, sixteenth or the like memory address. This facilitates the handling of large amounts of weight and input data. Weights are stored in large matrices of weights entries. The staggered memory access allows to address the needed weight data independent of the format in which the weight matrix is stored (line-wise or column-wise). In particular, lines and columns of the weight matrices can be easily accessed and transferred to the respective compute unit. The ability to access the shared memory in a staggered manner further facilitates the downsampling (a.k.a. stride) within a single network layer, where the output width of a network layer is lower than the input width of the same layer.

According to an illustrative aspect of the inventive technology, the shared memory unit comprises a decompression module for decompressing network data, in particular network weights, from a compressed state as stored in the shared memory unit to an uncompressed state as used in the first compute unit and/or the second compute unit. The decompression module may in particular be part of the memory controller. The decompression module reduces the memory capacity needed for storing network data of the at least one DNN.

In some examples, the chip comprises memory dimensioned to contain all network data, in particular all weights and biases, needed for executing the at least one DNN. This ensures, that after booting the processing chip, all network data is stored on the processing chip. Reloading network data from off-chip memory during computation of a DNN is avoided. For example, the chip may provide at least 8 Mbits for storing data, in particular at least 16 Mbits, e.g., more than 32 Mbits.

The required memory may be contained in the shared memory unit. As such, all input and output data as well as the network data may be stored on the shared memory unit.

In some examples, the processing chip may comprise one or more further memory units, in particular one or more local memory units, for at least one of its components, in particular for the first compute unit, the second compute unit and/or the control unit. The one or more local memory units may advantageously be connected to the respective component via a local data bus. Such local memory units allow to store network data which is only required by a respective component, so that this data and the corresponding data transfer does not strain the shared memory unit and the respective data bus system.

According to an illustrative aspect of the inventive technology, the control unit is configured to direct the first compute unit and/or the second compute unit to process layers of different DNN in parallel. This increases the flexibility of the audio signal processing using at least one DNN. For example, the CNN compute unit may process a CNN layer of first DNN while the RNN compute unit may process an RNN of a second DNN. It is also possible to process different RNN layers of different DNN in parallel by the RNN compute unit, in particular using different sets of slices for the respective RNN layers.

According to an illustrative aspect of the inventive technology, the processing chip comprises a pre-processing unit for pre-processing audio signals for being used as input data for the at least one DNN and/or a post-processing unit for post-processing a network output of the at least one DNN. Pre-processing may comprise any operation to generate a set of input data to be used by at least one layer of the at least one DNN, including but not limited to applying filtering functions, window functions, a Fast Fourier Transformation (FFT) and/or a Discrete Cosine Transformation (DCT). Post-processing may contain any operation to adapt an audio signal outputted by the at least one DNN and/or to generate an audio signal from an output of the at least one DNN, including but not limited to, computing an Inverse Fast Fourier Transformation (IFFT) and/or an Inverse Discrete Cosine Transformation (IDCT), applying window functions and/or performing artefact reduction. The processing chip may comprise separate pre-processing and post-processing units. It is also possible that pre-processing and post-processing is performed by a common pre-/post-processing unit. The respective units for pre-and/or post-processing may comprise hardware acceleration for performing the respective pre-processing step and/or post-processing step.

Additionally or alternatively, it is envisaged to perform pre-processing and/or post-processing, in particular feature extraction and/or artefact reduction, within a first layer and a last layer of the at least one DNN, respectively.

In some examples, the processing chip may comprise one or more analog function units for conducting analog functions such as adaptive body biasing, clock frequency adaption and/or supply voltage adaption for at least a part of the chip. Using such analog functions, the energy consumption and/or a leakage current may be reduced further.

The processing chip may comprise further processing units, e.g. analog blocks like analog-to-digital converters, digital-to-analog converters, power management and the like. Additionally or alternatively, such additional processing units may be incorporated on a separate chip of the hearing device.

In some examples, the processing chip comprises hardware acceleration for conditioning an input for and/or an output of one or more layers of the at least one DNN over multiple time steps, channels and/or dimensions, in particular for enabling features such as input time-wise convolutions. For example, the hardware acceleration may enable circular buffering and/or other schemes for combining several time-wise DNN input and/or output feature streams. In particular, input conditioning may enable DNN input with multiple time steps, in particular with a certain number of time steps, based on FFT frames. For example, time-wise convolutions may be computed by using an internal buffering and/or similar structures to retain intermediate results from previous runs. Output conditioning may in particular comprise buffering and/or storing the output of one or more layers of the at least one DNN over a certain number of the last time steps for further processing of other layers. The hardware acceleration for input and/or output conditioning may be comprised by the pre-/post-processing unit, the first and/or second compute unit, or by a dedicated conditioning unit.

In some examples, the processing chip, in particular the first and/or second compute unit, may comprise as scaling unit for scaling an output of a DNN layer and/or an intermediate output of the DNN layer, in particular before applying an activation function to the intermediate output. The scaling unit may have programmable bit-precision. The scaling unit may provide one or more of the following functionalities:

- Individual scaling factors and/or representation ranges may be defined for one or more DNN layers and applied before the activation function to an intermediate output of the respective DNN layer. As such, the respective DNN layer may be executed with high precision values right before the down-casting that happens before or as part of the activation function computation. For example, the intermediate output may be scaled down to 16 bit before activation with clipping capability.
- Individual scaling factors and/or representation ranges can be defined per channel and applied with low runtime overhead.
- Scaling factors and/or representation ranges can be specified directly in a deployment toolchain rather than through the quantization of parameters.

In some examples, approximative operations, including but not limited to scaling and/or activation functions, are specified such that the respective approximation error can be modelled during network training. For example, all approximative operations are specified correspondingly.

In some examples, the processing chip, in particular the first and/or second compute unit, is configured such that no numeric overflow and/or wrapping an overflow can occur during executing the at least one DNN, e.g., during any operation performed by the processing chip. Instead, operations may reduce precision, in particular in a predictable manner, and/or saturate to the minimum/maximum representable value.

It is a further feature of the present inventive technology to improve a hearing device.

The hearing device, in particular a hearing aid, comprises an input unit for obtaining an input audio signal, a signal processor for audio signal processing the input audio signal to obtain an output audio signal, an output unit for outputting the output audio signal, and a battery for powering the hearing device. The signal processor comprises a processing chip as described above. The hearing device is a single device. In that regard, the components comprised by the hearing device are to be understood to be integrated into the single device of the hearing device. The hearing device may be worn or implanted within, at or around an ear, in particular an ear canal, of a user. The hearing device and its components may be miniaturized, in particular such that the hearing device is implantable or wearable within, at or around the hearing canal. The advantages and example features of the hearing device coincide with that of the processing chip described above. The battery may be a rechargeable battery.

The signal processor may essentially comprise the processing chip. In some examples, the signal processor may comprise further off-chip logic, in particular processing units integrated on separate chips.

The hearing device may comprise a radio transceiver to transmit or receive data, in particular an audio signal. The radio transceiver may be part of the input unit. The input audio signal may comprise audio signals obtained by the input unit itself, e.g. by an electro acoustic transducer, and/or an audio signal received from another device, in particular another hearing device, smartphone, audio player, TV or any other such device. For example, audio signal processing may include binaural information containing audio signals received from another hearing device.

An output unit in the present context is configured to output the output audio signal. Outputting the output audio signal may comprise providing, in particular generating, a sound based on an output audio signal. In this case, the audio output unit may be formed by or comprise one or more electroacoustic transducers, in particular one or more speakers and/or so-called receivers. The output signal may also be an audio signal, e.g. in the form of an output audio stream and/or in the form of an electric output signal. An electric output signal may for example be used to drive an electrode of an implant for, e.g. directly stimulating neural pathways or nerves related to the hearing of a user.

The hearing device may be part of a hearing system comprising one or more hearing devices and/or peripheral devices, e.g. a smartphone, a smartwatch, a portable microphone and/or a table microphone.

In the foregoing, the disclosed technology has been described in connection to a wide bus for the second compute unit and a narrow bus network for the first compute unit. The present disclosure is not restricted to the presence of a wide bus and a narrow bus network, but also relates to technology, wherein a single data bus network, in particular a single data bus, is used to connect the first and the second compute unit to the shared memory. For example, the disclosed technology may relate to a processing chip for processing audio signals using at least one deep neural network in a hearing, the processing chip including:

- a first compute unit having a hardware architecture adapted for processing one or more convolutional neural network layers of the at least one DNN,
- a second compute unit having a hardware architecture adapted for processing one or more recurrent neural network layers of the at least one DNN,
- a control unit for directing the first compute unit and the second compute unit when to compute a respective layer of the at least one DNN,
- a shared memory unit for storing data to be processed in respective layers of the at least one DNN, and
- a data bus system for providing access to the shared memory unit for each of the first compute unit and the second compute unit.

The processing chip may comprise one or more of the aforementioned features.

With reference to the FIGS. 1 to 5, a first embodiment of a hearing device 1 is described. The hearing device 1 is in particular a hearing aid, e.g. a wearable hearing aid or a hearing implant. The hearing device 1 is configured to be worn or implanted at or in the ear of a hearing impaired user and aids the user to compensate for any kind of hearing loss, to reduce hearing effort, to improve speech intelligibility, to mitigate the risk of hearing loss and/or to generally process audio signals.

The hearing device 1 comprises an input unit 2 for obtaining an input audio signal I and a signal processor 3 for audio signal processing the input audio signal I to obtain an output audio signal O, and an output unit 4 for outputting the output audio signal O to a user. The hearing device 1 further comprises a rechargeable battery 5 for supplying electric energy to the hearing device components. Due to size restrictions, the rechargeable battery 5 necessarily has a small capacity. Exemplary hearing device batteries have a capacity which is about 100 times smaller than the battery capacity of a smartphone. For example, the battery capacity can be in the range of 20 mAh to 100 mAh.

In the present embodiment, the input unit 2 comprises one or more electroacoustic transducers, especially in the form of one or more microphones. For example, several electroacoustic transducers may be used, in particular a front microphone and rear microphone, to obtain spatial information of the input audio signal I. The input unit 2 receives ambient sound S and provides the input audio signal I. In a further embodiment, one of the microphones might also be facing into the ear canal.

The output unit 4 comprises one or more electroacoustic transducers, in particular a receiver, for outputting the output audio signal O as acoustic sound S'.

An audio signal, in particular the input audio signal I and the output audio signal O, may be any electrical signal which carries acoustic information. For example, the input audio signal I may be raw audio data, which is obtained by the input unit 2 by receiving the ambient sound S. The input audio signal I may further comprise processed audio data, e.g. compressed audio data and/or a spectrum and/or features obtained from the ambient sound S.

The signal processor 3 comprises a processing chip 6 for processing audio signals using at least one deep neural network. Processing chip 6 is a monolithic chip being formed on a single wafer of silicone. The signal processor 3 further comprises off-chip logic 7. Off-chip logic 7 comprises processing units/routines, which are not contained in the processing chip 6. In other embodiments, all processing units/routines may be comprised by processing chip 6.

In the shown embodiment, the off-chip logic 7 comprises an analogue-to-digital converter 8 for the input audio signal I and a digital-to-analogue converter 9 for the output audio signal O. The off-chip logic 7 further comprises a power management 10 for managing electric power provided by and/or to the rechargeable battery 5. In further embodiments, off-chip logic 7 may comprise further processing units/routines for processing audio signals, e.g. a beamformer or the like.

Processing chip 6 is adapted for audio signal processing using at least one deep neural network (DNN). DNN processing is particularly suitable for high quality audio signal processing. The DNN may be used to compute any suitable task in the audio signal processing. For example, the at least one DNN may be used for classifying an acoustic auditory scene, noise cancelling, speech command analysis, source separation, own voice detection, speaker recognition, and/or output audio signal generation. However, DNN computation is by many orders of magnitude more compute and data intensive than classical signal processing. This is particularly the case for complex audio signal processing tasks, which require deep neural networks comprising layers with different network architectures.

Figure 6:
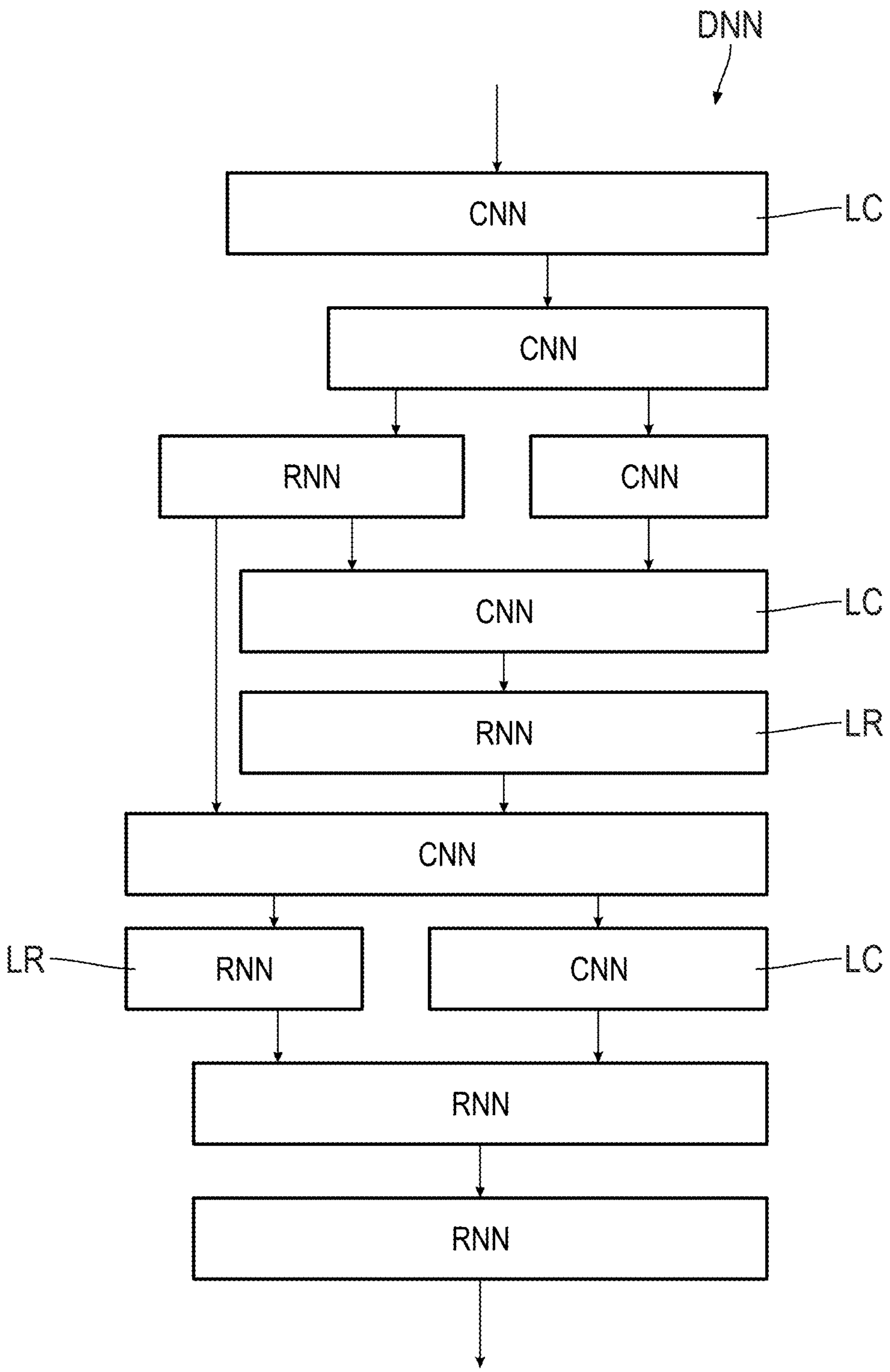
FIG. 6 shows a flow diagram of a structure of an exemplary deep neural network to be executed using the processing chip of the hearing device of FIG. 1.

An exemplary DNN is shown in FIG. 6. The DNN comprises many successively arranged layers L, of which only some are labelled with the reference sign "L" for clarity. Each layer L comprises an individual neural network. In some layers L, different neural networks are computed in parallel. In general, the different neural networks contained in the DNN may have different width, structure and non-linear functions to compute. The different layers L/neural networks can be categorized in different network architectures, in particular in convolutional neural networks (CNN) and recurrent neural networks (RNN). In the following, a layer L comprising a CNN will be referred to as CNN layer LC, a layer L comprising a RNN will be referred to as RNN layer LR, as exemplarily denoted for some of the layers in FIG. 6. CNN layers LC and RNN layers LR may be commonly referred to as layers L.

The intermixing of both types of neural networks layers in the DNN is particularly suitable for complex audio signal processing tasks. CNN layers LC are particularly suitable for solving problems related to data structures, such as frequency spectra. RNN layers LR are particularly suitable for analyzing temporal/sequential data, thereby providing temporal context. These different neural network types have different demands in compute and data throughput. In CNN layers LC, many weights are reused with new input data to compute a new output, the amount of single operations per output is very large. In RNN layers LR, many more weights are needed per input to generate an output. As such, these different types of neural networks require different hardware architectures to compute them efficiently.

In FIG. 6, data flow between the different layers L of the DNN is shown as arrows. The output of one layer L serves as the input for another layer L. As such, the different layers L have to be computed sequentially, requiring exchanging input and output data in between the neural network layers L. In particular, a subsequent layer L requires data access to the output data of the previous layer.

The processing chip 6 is adapted for efficiently processing DNNs comprising layers with different network structures. The processing chip 6 comprises a pre-/post-processing unit 12. The pre-/post-processing unit 12 serves for pre-processing the input audio signal I before being processed by the at least one DNN. Pre-processing may in particular comprise applying a Fast Fourier Transformation (FFT), a Discrete Cosine Transformation (DCT), window functions, filtering and/or other audio processing routines to the input audio signal I. In particular, pre-processing the input audio signal I may result in a set of input features to be used as input data for the at least one deep neural network.

The pre-/post-processing unit 12 further serves for post-processing an output of the at least one deep neural network to obtain the output audio signal O. For example, post-processing may comprise computing an Inverse Fast Fourier Transformation (IFFT) and/or computing an Inverse Discrete Cosine Transformation (DCT) and/or applying window functions and/or performing artefact reduction.

While in the shown embodiment, the pre-/post-processing unit 12 provides the functionalities of pre-processing and post-processing, in other embodiments, separate pre-processing and post-processing units may be provided, in particular comprising separate signal processing cores.

The processing chip 6 further comprises a first compute unit 14 having hardware architecture adapted for processing one or more CNN layers LC of the at least one DNN. The first compute unit 14 is also referred to as CNN compute unit. The processing chip 6 further comprises a second compute unit 15 having a hardware architecture adapted for processing one or more RNN layers LR of the at least one DNN. The second compute unit 15 is also referred to as RNN compute unit.

The processing chip 6 comprises a control unit 16 for directing the first compute unit 14 and the second compute unit 15 when to compute a respective layer L of the at least one DNN. The control unit 16 may also be referred to as a scheduler scheduling the processing of the individual layers L of the at least one DNN.

Processing chip 6 comprises a shared memory unit 17. The shared memory unit 17 comprises shared memory 18, in particular in form of random access memory. Shared memory 18 is segmented in a plurality of segments 19. Shared memory unit 17 further comprises a memory control 20 for accessing the shared memory 18. Memory controller 20 is connected to the segments 19 by respective memory links 21. Memory links 21 may for example provide at least a 128 bit connection. In the shown embodiment, shared memory unit 17 comprises eight segments 19 and eight memory links 21. Of course different numbers of segments 19 and memory links 21 are possible. It is also possible that the shared memory 18 is not segmented in individual segments.

Shared memory 18 is dimensioned to contain all data required for executing the at least one DNN when audio signals are processed by the processing chip 6. This data includes input data which is to be processed by the individual layers L of the at least one DNN. As discussed above, the input of one layer L may be the output of another layer. As such, the shared memory 18 is dimensioned to store outputs of at least parts of the layers L of the at least one DNN. Further, the shared memory 18 is dimensioned to store all relevant network data, including weights and biases. This ensures that during execution of the at least one DNN, no network data has to be loaded from off-chip memory, decreasing data transfer times. In a non-limiting example, the shared memory 18 provides at least 8 Mbits for storing data, e.g., more the 16 Mbits, e.g., more than 32 Mbits.

The shared memory 18 contains the network data required for the individual layers L of the at least one DNN. This includes large amounts of weight matrices and bias vectors. In some examples, such data is stored in a compressed state on the shared memory 18. The memory controller 20 comprises a decompression module 22 for decompressing the compressed network data, in particular compressed weights, when accessed by the respective first compute unit 14 and/or second compute unit 15.

The memory controller 20 is configured for optionally accessing the shared memory 18 in a staggered manner, e.g. by accessing only every second, fourth, eighth and so-on memory address. This way, weight matrices can be accessed line or column wise irrespectively of the format stored on the shared memory 18. This further facilitates the downsampling (a.k.a. stride) within a single network layer L, where the output width of a network layer L is lower than the input width of the same layer L. This facilitates the memory access for executing the different layers L of the at least one DNN, which may comprise calculating large amounts of scalar products of weight matrices with data vectors.

The processing chip 6 further comprises a direct memory access unit 23 for independently accessing and moving data from one location in the shared memory 18 to another. Using the direct memory access unit 23, data stored on the shared memory 18 can be reorganized, e.g. for serving as input data for another layer L of the at least one DNN.

The processing chip 6 comprises a data bus system 25 for providing a data connection between the respective components discussed above, in particular for providing data access to the shared memory unit via the memory controller 20 for the CNN compute unit 14, the RNN compute unit 15, the control unit 16, the direct memory access unit 23 and the pre-/post-processing unit 12. The data bus system 25 is schematically shown by lines connecting the respective components in FIG. 1.

The data bus system 25 comprises a wide bus 26, which provides exclusive access to the shared memory unit 17 for the RNN compute unit 15. The wide bus 26 is schematically depicted as a thick dotted line in FIG. 1. The wide bus 26 has a bandwidth of at least 1024 bits. Using the wide bus 26, the RNN compute unit 15 can exchange large amounts of data within a single compute unit clock cycle, in particular weights and input data needed to execute RNN layers LR.

The data bus system 25 further comprise a narrow bus network 27, schematically depicted by narrow lines connecting further components of the processing chip 6. The narrow bus network 27 may comprise a single data bus connecting the respective components and/or a plurality of data buses, e.g. data buses connecting individual of the components (as schematically shown in FIG. 1).

The data buses of the narrow bus network 27 have a narrower bandwidth than the wide bus 26. In exemplary embodiments, the bandwidth of a data bus of the narrow bus network 27 may be 128 bit. The narrow bus network 27 is only schematically shown in FIG. 1. For example, individual buses are shown to connect individual components of the processing chip 6. For example, the data buses for connecting the pre-/post-processing unit to the shared memory unit 17 and the control unit 16 are exemplarily depicted in FIG. 1. The pre-/post-processing unit 12 may be connected by one or more data buses of the narrow bus network 27 to each of the further components of the processing unit.

The processing chip 6 comprises an analogue functions unit 24, schematically shown in FIG. 1. Analogue functions unit 24 provides analogue functions to reduce energy consumption of the processing chip, e.g. by adaptive body biasing, clock frequency adaption and/or supply voltage adaption to at least parts of the processing chip 6.

The CNN compute unit 14 and the RNN compute unit 15 each comprise hardware architectures to process respective neural network architectures. This increases the efficiency of processing of the respective neural network architectures. Thus, the respective neural network layers L can be computed efficiently, without requiring a high compute unit clock frequency F. This reduces the energy consumption of the processing chip. In particular, it enables the processing of complex DNN in the hearing device 1 despite the small battery capacity of the rechargeable battery 5. Exemplary, the compute unit clock frequencies might lie in the range of 10 MHz to 100 MHz only, whereas the clock frequency in a GPU (graphic processing units) customarily used to process DNN's are usually in the range of 1 GHz or more, drawing unsustainable amounts of power for the battery capacity available in a hearing device.

The memory controller 21 is configured for running on a memory controller clock frequency f, which is higher than the compute unit clock frequency F. The memory controller clock frequency is given by $f=K\cdot F$, wherein K is at least 2. This ensures that the CNN compute unit 14 and the RNN compute unit 15 can concurrently access the shared memory 18 within the same compute unit clock cycle. This reduces, in particular eliminates, stalling the compute units 14, 15 while waiting to finish a memory access. In some examples, K may be in the range between 2 and N, wherein N is the number of all processing units potentially requiring access to the shared memory 18. K=N allows all processing units to concurrently access the shared memory 187 within the same compute unit clock cycle.

Figure 2:
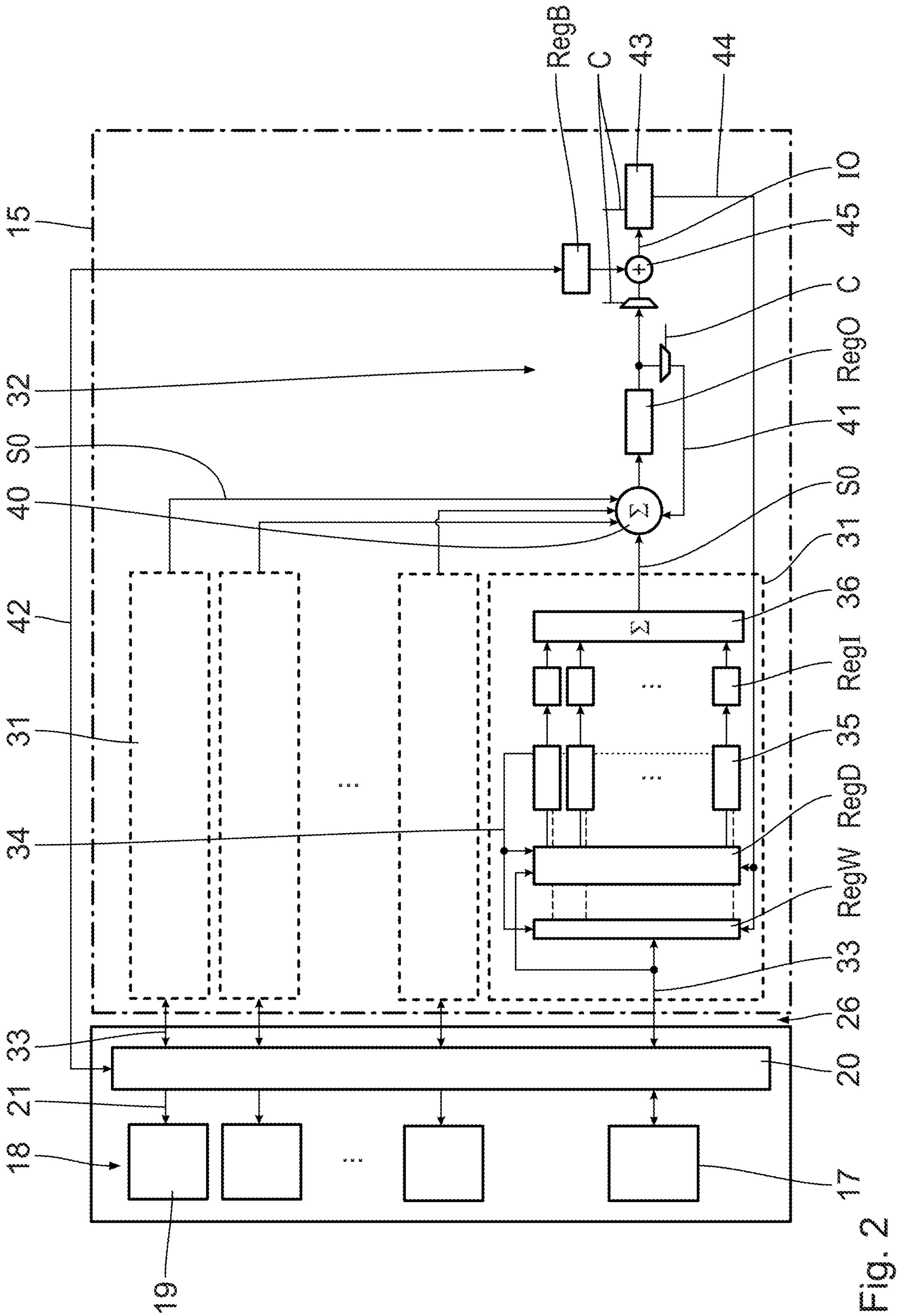
FIG. 2 shows a schematic depiction of a RNN compute unit of the processing chip of the hearing device of FIG. 1.
Figure 3:
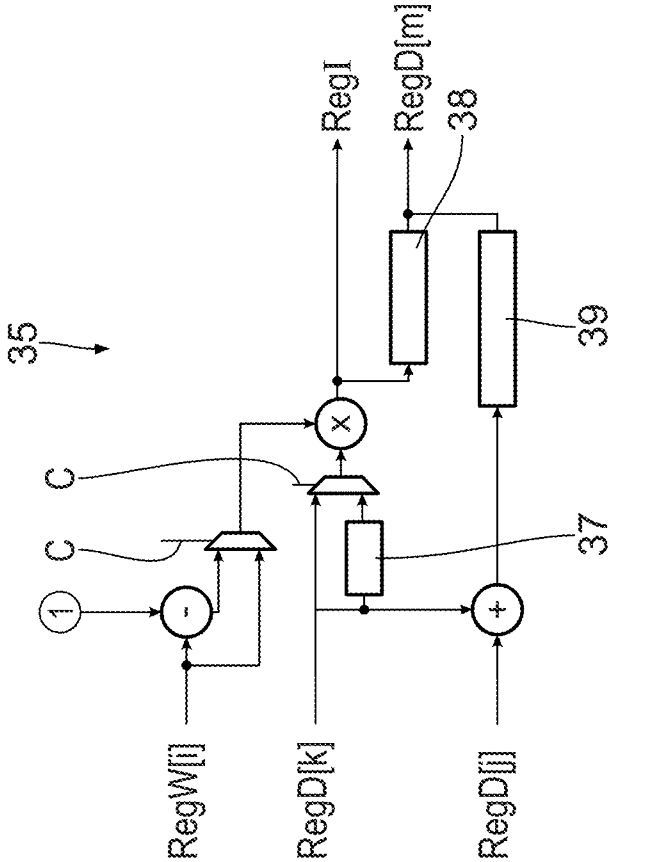
FIG. 3 shows a schematic depiction of a processing element of the RNN compute unit of FIG. 2.

With reference to FIGS. 2 and 3, an exemplary configuration of the RNN compute unit 15 is described. The RNN compute unit 15 comprises a plurality of slices 31 of which only one slice 31 is shown in detail. The remaining slices 31 are configured equivalently. The slices 31 be executed by the RNN compute unit 15 independently of each other. In the shown embodiment, the RNN compute unit 15 comprises eight slices 31 of which four slices 31 are exemplarily shown. Downstream to the slices 31, the RNN compute unit 15 comprises off-slice logic 32.

Each slice 31 is connected via a sub-bus 33 to a respective segment 19 of the shared memory 18 via the memory controller 20. The individual sub-buses 33 together form the wide bus 26. For example, each sub-bus 33 may have a bandwidth of 128 bit. The sub-buses 33 allow each of the slices 31 to independently and concurrently access the shared memory 18.

Each slice 31 comprises a weight register RegW for storing weight data and a data register RegD for storing input/output data to be processed by the respective RNN layer LR. The register RegW, RegD are connected to the shared memory unit 17 by the respective sub-bus 33.

Downstream to the registers RegW, RegD, there is a plurality of parallel processing elements 35. The parallel processing elements 35 are each connected to the registers RegW, RegD and downstream thereto to a respective intermediate register RegI. Downstream from the intermediate registers RegI, there is a summation component 36 for summing up the data stored in the intermediate registers RegI.

Each of the processing elements 35 is configured as exemplarily shown in FIG. 3. The processing element 35 is an arithmetic logic unit (ALU) which receives as input data an element i of the weight register RegW (RegW[i]) and elements k and j of the data register RegD (RegD[k], RegD[j]). Using the processing element 35, all relevant computations for neural network cells of RNN layers LR, in particular GRU and/or LSTM cells, can be executed. The processing element 35 comprises the arithmetic functionality as depicted in FIG. 3, in particular the possibility to multiply the weight entry RegW[i] with the data entry RegD[k]. Further, the processing element 35 comprises a scaling and saturation function 37, a truncation function 38 and a saturation and truncation function 39. The scaling and saturation function 37 may for example comprise a hyperbolic tangent (e.g. for the processing of LSTM cells) or a simpler scaling and saturation function. Via control inputs C the different arithmetic functions to be used in the respective RNN layer LR can be chosen. The control inputs C can for example be provided by the control unit 16 via the narrow bus system 27 and stored in configuration registers of the RNN compute unit.

The slice 31 comprises a return loop 34 for transmitting an output of the processing element 35 to the weight register RegW and/or the data register RegD. The respective outputs of the processing element 35 are written to the m component of the data register RegD (RegD[m]) via the return loop 34 or to the respective intermediate register RegI, respectively. Writing to the data and/or weight register may, e.g., be used for multiply-add operations and/or for further local scalar multiplications within a GRU or LSTM cell.

The plurality of parallel processing elements 35 and the downstream summation component 36 allow to calculate a scalar product of two vectors in two clock cycles. For example, a scalar product of a data vector with a column of a weight matrix can be calculated within two clock cycles.

In the following, dimension details of the slice 31 are exemplarily described. For example, the slice 31 may comprise 16 parallel processing elements 35 and correspondingly 16 intermediate registers RegI. The weight register RegW can have 16×8 bits, the data register RegD 16×16 bits. The data path in-between the registers and the processing elements can be chosen accordingly. In some examples, also only a part of the register width may be used, e.g., 4 bit for weights in the weight register RegW and/or 8 bit in the data register RegD. The multiplication units may be configured for enabling not only multiplication by the maximum available width (e.g. 8×16 bit operations), but also smaller operation width, for example 8×8 bit or 4×8 bit or 4×16 bit operations. That allows to further reduce power consumption, as parts of the computing resources are not utilized where not needed.

A slice output SO of each slice 31 is the sum provided by the summation component 36. The off-slice logic 32 comprises a further summation component 40 for selectively summing up the slice outputs SO of different slices 31. In some examples, the summation by the summation component 40 takes place in the same clock cycle as the summation by the summation component 36. In other words, the selective summation of several slices 31 does not require an additional clock cycle.

The summation result of the summation component 40 is stored in an output register RegO. For selectively summing up different sets of slices, the output register RegO provides several register elements for containing the respective outputs. That way, different calculations can be performed parallelly by different sets of slices 37.

Based on the control input C, the elements of the output register RegO can be fed back via return loop 41 to the summation component 40 to be added to further outputs of selectively chosen slices 31. Alternatively, the elements of the output register RegO can be further processed by adding a bias. To this end, a bias register RegB is provided which can be connected to the shared memory unit 17 via a respective data bus 42. Data bus 42 can be part of the wide bus 26 or the narrow bus network 27. Via the shown embodiment, the bias data is stored on the shared memory unit 17, it is also possible that the bias is stored on a different memory unit, e.g. on a local memory of the RNN compute unit.

The bias from the bias register RegB is added to the output from the output register RegO at an add element 45. The resulting sum is an intermediate output IO of the RNN, which is inputted to an activation function module 43. Activation function module 43 applies an activation function of the respective RNN layer LR to the intermediate output IO. The activation function may in particular be a sigmoid function or a hyperbolic tangent function. The activation function can, for example, be chosen by a respective control input C. The activation function module 43 comprises hardware acceleration for efficiently calculating the respective activation function.

The output of the activation function module 43 is written back to a selectable element of the weight register RegW and/or the data register RegD via a output loop 44. From the register RegW and/or RegD, the respective sub-bus 33 can be used to write the obtained output data to a respective segment 19 of the shared memory unit 17 or for computation of further scalar products within e.g. a GRU or LSTM cell.

The above configuration of the RNN compute unit 15 allows to apply any parallel instructions to large amounts of data. In particular, scalar products can be efficiently computed to process RNN layers LR. Using the wide bus 26, large amounts of data can be fed to the RNN unit 15 and the respective output data can be written back to the shared memory unit 17 in an efficient manner, i.e. without requiring to stall the processing units while waiting for data transfer. This allows to use the calculation results of other layers L of the at least one DNN as input to the to be calculated RNN layer LR and/or to use the result of the RNN layer LR as input for other layers L of the at least one DNN.

Figure 4:
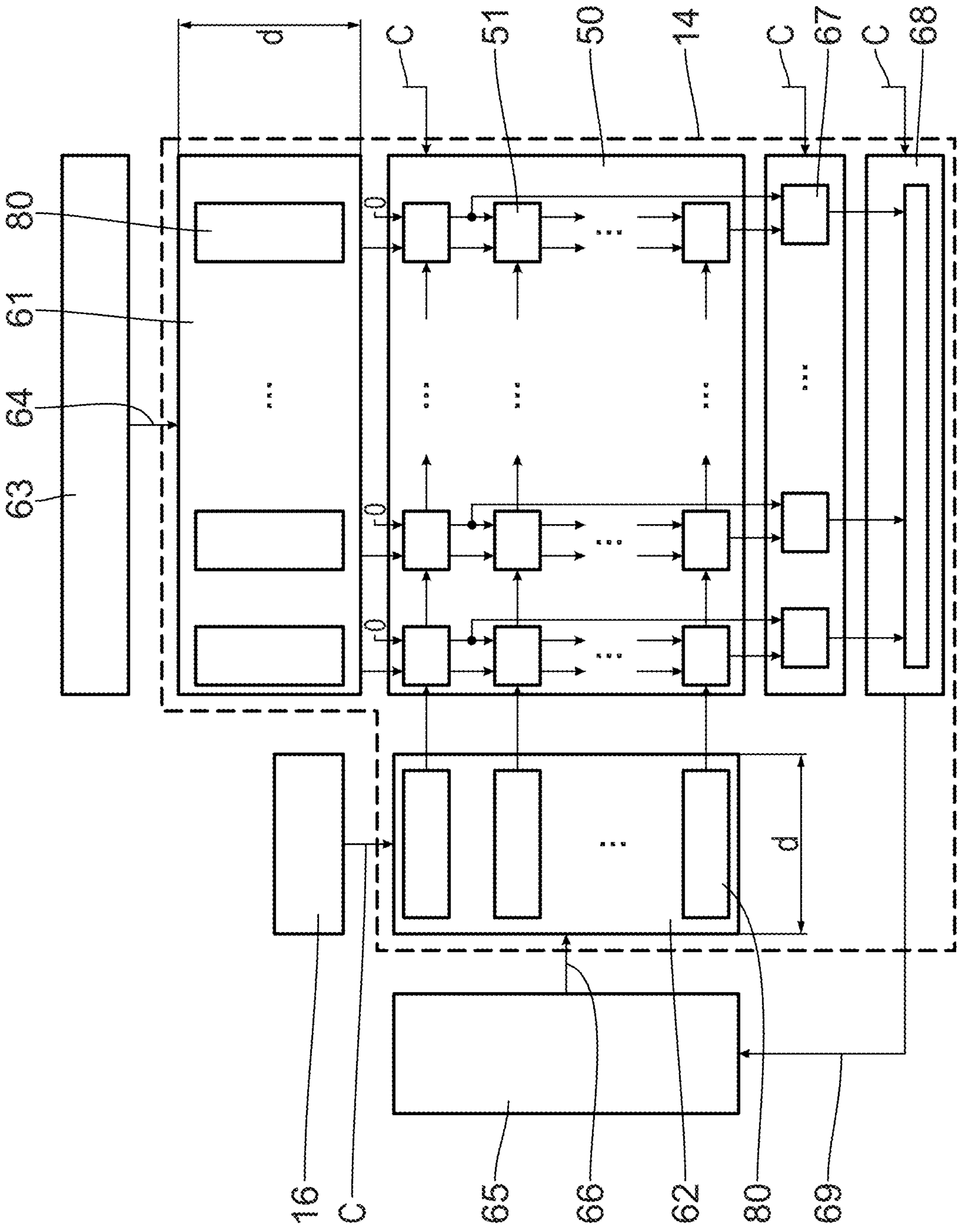
FIG. 4 shows a schematic depiction of a CNN compute unit of the processing chip of the hearing device in FIG. 1.
Figure 5:
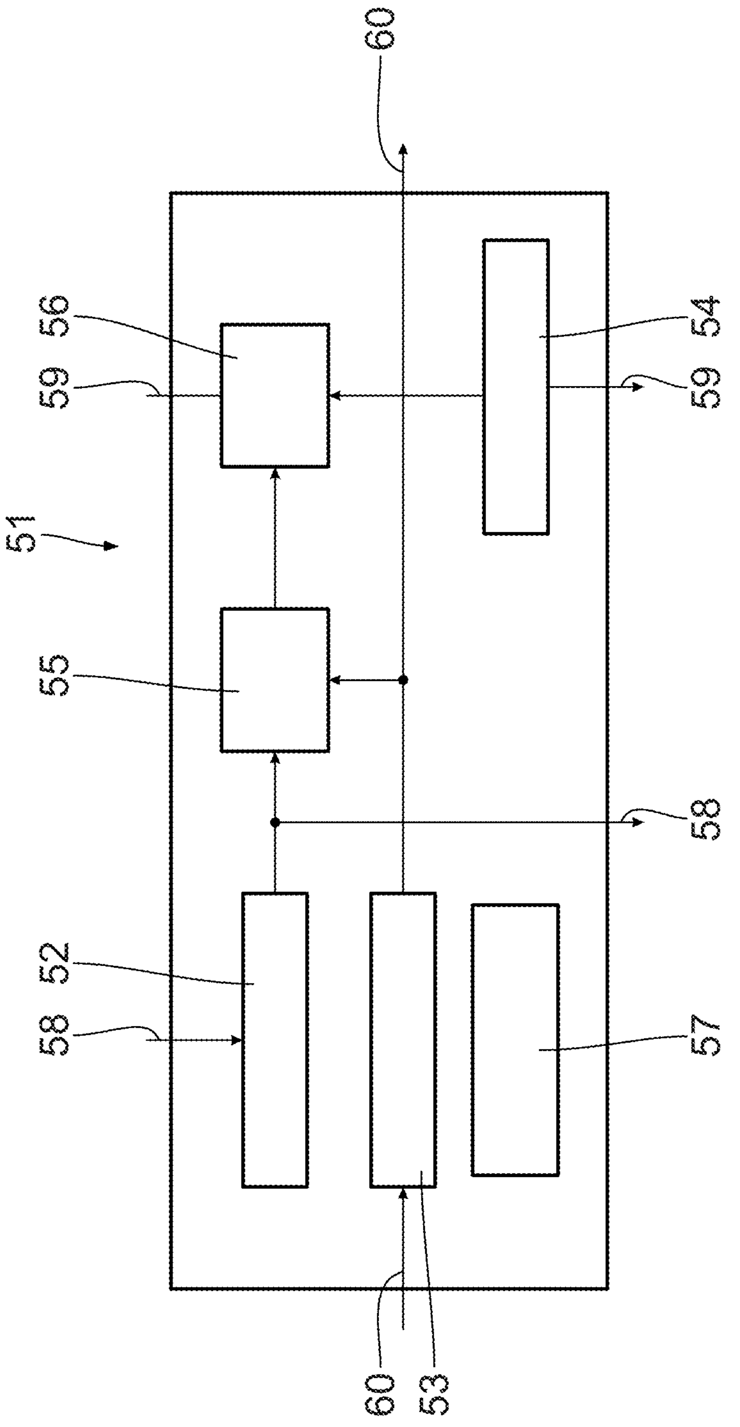
FIG. 5 shows a schematic depiction of a processing element of the CNN compute unit according to FIG. 4.

With respect to FIGS. 4 and 5, the CNN compute unit 14 is described in greater detail.

The CNN compute unit 41 comprise a systolic array 50 of X×Y processing units 51. In an exemplary embodiment, the systolic array may comprise 16×16 processing elements.

The processing elements 51 contain registers for weight data, input data and output data as well as arithmetic elements to compute e.g. a multiply-add, max and/or other operations. An exemplary processing element 51 is shown in FIG. 5. It comprises the weight register 52, the input register 53 and the output register 54 as well as arithmetic elements 55, 56 for applying multiplication and summation operations, respectively. The processing element 51 may further comprise a glue logic 57 used to e.g. configure the processing element.

Output data paths 58, 59, 60 of the processing element 51 are connected to neighboring or nearby processing elements, where they form respective input paths. Thereby, the data required for processing is locally stored in the processing elements and local data paths are established between the processing elements. Thus, the output data and/or the weights can to be reused in the next processing step in the same, an adjacent and/or a nearby processing element 51 without further data traffic to a memory.

The CNN processing unit 14 comprises a weight FIFO 61 and an input FIFO 62. A FIFO is a data buffer working according to the "first in, first out" principle. The weights FIFO 61 and the input FIFO 62 are implemented with delayed registers 80 to feed respective weight data elements and input data elements successively to the respective processing elements 51. A depth d of the FIFOs corresponds to the number of processing elements in the systolic array. Via the FIFOs 61, 62, large amounts of input data and weight data can be accessed and successively processed by the systolic array 50. To that end, the weight FIFO 61 is connected to a weights memory 63 via weights data bus 64. The input FIFO 62 is connected to an input memory 65 via an input bus 66. In the shown embodiment, the weights memory 63 and the input memory 65 are part of the shared memory 18. The weights bus 64 and the input bus 66 are part of the narrow bus network 27. The FIFOs 61, 62 purpose is to reuse either weights or input data in different processing schemes, i.e. weight stationary, input stationary or output stationary concurrent computations of different convolutions using equal or similar sets of input, weight and output data. They further allow to decouple the memory access from the actual compute step by buffering parts of a vector while other parts are still to be loaded or saved.

The outputs of the processing element 51 are fed to respective activation blocks 67 at which a non-linear function is applied to the outputs of the processing elements 51. The outputs of the activation block 67 is fed to a pooling layer 68 and from there via an output data bus 69 back to the input memory 65. The output bus 69 is part of the narrow bus network 27.

Via the control unit 16, control inputs C can be used to steer the processing in the CNN compute unit 14. By example, the control unit 16 might use only a part of the systolic array if the vector widths to be processed do not demand the usage of the full array size.

The control unit 16 knows the structure of the at least one DNN. For example, a compiler used for compiling the DNN (e.g. Google's TensorFlow) may provide information on the structure, in particular on the arrangement of the individual layers L and their architectures. Knowing the structure of the DNN, the control unit 16 sequentially initiates the processing of the respective layers L by the suitable compute unit 14, 15. The compute units 14, 15 provide status information on the execution of the respective layer L to the control unit. In particular, the compute units 14, 15 send information to the control unit 16 about completion of a calculation of the respective layer L. Based on this information, the control unit 16 can initiated the execution of the next layer L, in particular by providing respective control inputs C. The control unit 16 may further provide control inputs C to steer the processing of the respective layer L on the respective compute units. For example, a control input C may be used to select a respective activation function.

Between or concurrent with the execution of successive layers L of the at least one DNN, the control unit 16 can instruct the direct memory access unit 23 to rearrange the data on the shared memory 18 to be best accessed during the next computational step. For example, the outputs of a prior computation step may be redistributed on different segments 19 so that they can be individually and efficiently accessed by different slices 31 of the RNN compute unit 15. By example, the direct memory access unit 23 might load vector data from the shared memory 18 starting from a certain base address with a specific stride U, i.e. accessing only every Uth memory address, and storing such vector data elements starting from another base address with another stride V, i.e. storing such vector elements with a memory address distance V in the shared memory.

The control unit 16 can also direct the compute units 14, 15 to simultaneously process one or more layers of different DNNs. For example, the processing chip 6 can be used to process audio signal using two or more DNN, e.g. for classification and noise cancellation. For example, the CNN compute unit 14 may be needed to process a CNN layer LC of a first DNN. Until the processing of the CNN layer LC is finished, no further layer L of the DNN can be processed. In such an instance, the RNN compute unit 15 may be used to process a RNN layer LR of a second DNN. Further, layers L of different DNN may have different widths. For example, a RNN layer LR of a first DNN may not use all slices 31 of the RNN compute unit 15. Since each slice has individual access to the shared memory 18, and the slices can be executed individually, a RNN layer LR of a second DNN can be processed in parallel on slices not needed for processing the RNN layer LR of a first DNN. Likewise, if the systolic array of the CNN compute unit 14 can also be used to concurrently compute layers of a second CNN layer LC when the vector sizes are sufficiently small such that not the entire array is utilized already for a first CNN layer LC. This way, the resources of the processing chip 6 can be efficiently used for processing at least one complex DNN, thereby improving audio signal processing on the hearing device 1.

Figure 7:
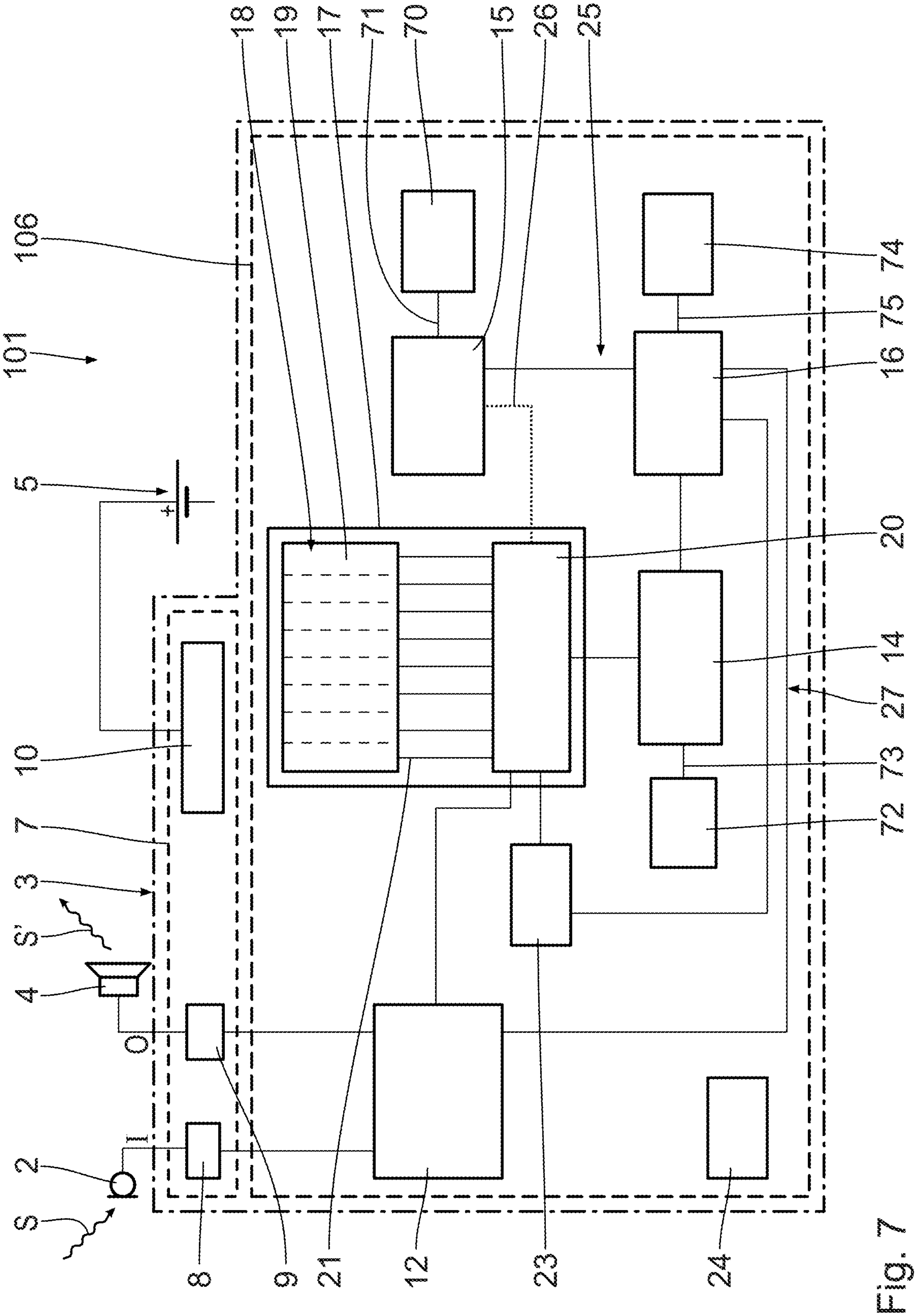
FIG. 7 shows a schematic depiction of a further embodiment of a hearing device comprising a processing chip for processing audio signals using at least one deep neural network.

FIG. 7 shows a further embodiment of a hearing device 101. Components, signals and features, which correspond to those already described with respect to the embodiment in FIG. 1, bear the same reference signs and are not discussed in detail again.

Hearing device 101 differs from hearing device 1 in FIG. 1 in that the processing chip 106 comprises local memory units, which are associated with specific components of the processing chip 106. Local memory unit 70 is associated with the RNN compute unit 15 and connected thereto by local bus 71. Local memory unit 72 is associated with the CNN compute unit 14 and connected thereto by local bus 73. Local memory unit 74 is associated with the control unit 16 and connected thereto by local bus 75. Local memory units 70, 72, 74 comprise private memory which may during computation of a DNN layer L only be accessed by the respective first compute unit 14, second compute unit 15 and control unit 16, respectively. Local memory units 70, 72, 74 may comprise data only needed by the respective associated component. This way, the shared memory 18 may be mainly used by weight data and/or input and output data which has to be shared between the different compute units 14, 15. Data can more flexibly be distributed on the processing chip 106. Moreover, data access is simplified for the respective components. In particular, not all data access has to be controlled by the memory controller 20, relieving the data traffic therethrough.

Thus, even though there is a certain advantage of providing local memory to the compute units 14, 15, the shared memory unit 17 is more flexible in its usage for different kind of DNN's. For example, in a hypothetical chip architecture with only local memories the physically available on-chip memory, which allows for fast and efficient access, might run out and be too small for a DNN requiring a lot of weights for the CNN layer LC while in the local memory of the RNN compute units there's still ample space. In a different DNN with exactly the opposite situation, the local memory in the RNN compute units might be too small thus not allowing to compute it at all or at least not in an efficient manner without re-loading of weights during computation of a DNN. Using a shared memory unit 17 as described mitigates the problem as memory can flexibly be used in either compute unit 14, 15 according to the needs of the DNN structure.

What is claimed is:

1. A processing chip for processing audio signals using at least one deep neural network in a hearing device, wherein the processing chip comprises:

a first compute unit having a hardware architecture adapted for processing one or more convolutional neural network layers of the at least one deep neural network, a second compute unit having a hardware architecture adapted for processing one or more recurrent neural network layers of the at least one deep neural network, the second compute unit comprising a plurality of slices, a shared memory unit for storing data to be processed in respective layers of the at least one deep neural network, the shared memory unit comprising a memory controller configured for running on a memory controller clock frequency that is higher than a compute unit clock frequency of both the first compute unit and the second compute unit, and a data bus system for providing access to the shared memory unit for each of the first compute unit and the second compute unit, wherein the data bus system comprises a wide bus to the shared memory unit for the second compute unit, and wherein the wide bus provides concurrent data access to the shared memory unit for each slice included in the plurality of slices.

2. The processing chip according to claim 1, wherein the wide bus has a bandwidth of at least 1024 bits for providing access to the shared memory unit only for the second compute unit.

3. The processing chip according to claim 2, wherein the wide bus comprises a plurality of sub-buses for providing the concurrent data access to the shared memory unit for each slice included in the plurality of slices.

4. The processing chip according to claim 3, wherein each slice included in the plurality of slices has access to a respective segment of the shared memory unit via a respective sub-bus included in the plurality of sub-buses.

5. The processing chip according to claim 1, wherein the first compute unit comprises a two-dimensional array of processing elements.

6. The processing chip according to claim 5, wherein the first compute unit is configured for dividing the two-dimensional array of processing elements into two-dimensional sub-arrays, which can be executed independently of each other.

7. The processing chip according to claim 1, wherein each slice included in the plurality of slices is configured to compute a scalar product of two vectors in at most three clock cycles.

8. The processing chip according to claim 1, wherein the plurality of slices are configured to be executed independently of each other.

9. The processing chip according to claim 1, wherein the second compute unit is configured to sum up a slice output of a selectable set of slices included in the plurality of slices.

10. The processing chip according to claim 1, wherein the second compute unit comprises hardware acceleration adapted for applying an activation function to an intermediate output of the second compute unit.

11. The processing chip according to claim 1, wherein the shared memory unit comprises a decompression module for decompressing network data from a compressed state as stored in the shared memory unit to an uncompressed state as used in at least one of the first compute unit or the second compute unit.

12. The processing chip according to claim 1, comprising at least one of a pre-processing unit for pre-processing audio signals for being used as input data for the at least one deep neural network or a post-processing unit for post-processing a network output of the at least one deep neural network.

13. The processing chip according to claim 1, wherein the data bus system further comprises a narrow bus network to the shared memory unit for the first compute unit.

14. The processing chip according to claim 1, further comprising a control unit for directing the first compute unit and the second compute unit when to compute a respective layer of the at least one deep neural network.

15. The processing chip according to claim 14, wherein the control unit is configured to direct at least one of the first compute unit or the second compute unit to process layers of different deep neural networks included in the at least one deep neural network in parallel.

16. A hearing device comprising:

an input unit for obtaining an input audio signal, a signal processor for audio signal processing the input audio signal to obtain an output audio signal, an output unit for outputting the output audio signal, and a battery for powering the hearing device, wherein the signal processor comprises the processing chip according to claim 1 for contributing to the audio signal processing.

* * * * *